United States Patent
Kikin-Gil et al.

(10) Patent No.: US 10,241,643 B2
(45) Date of Patent: Mar. 26, 2019

(54) NAVIGATING CONTENT HIERARCHIES AND PERSISTING CONTENT ITEM COLLECTIONS

(71) Applicant: Microsoft Corporation, Redmond, WA (US)

(72) Inventors: Erez Kikin-Gil, Bellevue, WA (US); Mark Eugene Pearson, Renton, WA (US); Vignesh Sachidanandam, Mercer Island, WA (US); Doreen Grieb, Kirkland, WA (US); Patrick Malatack, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 114 days.

(21) Appl. No.: 13/724,717

(22) Filed: Dec. 21, 2012

(65) Prior Publication Data

US 2014/0181708 A1    Jun. 26, 2014

(51) Int. Cl.
G06F 3/048      (2013.01)
G06F 3/0482     (2013.01)
G06F 3/0481     (2013.01)
G06F 3/0488     (2013.01)
G06F 17/30      (2006.01)
G06F 3/0485     (2013.01)
G06F 3/0484     (2013.01)

(52) U.S. Cl.
CPC .......... *G06F 3/0482* (2013.01); *G06F 3/0481* (2013.01); *G06F 3/04883* (2013.01); *G06F 17/30126* (2013.01); *G06F 3/0484* (2013.01); *G06F 3/0485* (2013.01); *G06F 3/04842* (2013.01); *G06F 17/30961* (2013.01)

(58) Field of Classification Search
CPC .. G06F 3/0481; G06F 3/0482; G06F 3/04842; G06F 3/04883; G06F 3/0485; G06F 9/4443; G06F 17/30961
USPC .................................................. 715/853–855
See application file for complete search history.

(56) References Cited

U.S. PATENT DOCUMENTS 5,835,094 A * 11/1998 Ermel et al. .................. 715/848
6,181,342 B1   1/2001 Niblack
7,378,969 B2   5/2008 Chan et al.
(Continued)

FOREIGN PATENT DOCUMENTS

CN    1647035    7/2005
CN    1955998    5/2007
(Continued)

OTHER PUBLICATIONS

Windows Explorer—25-11-2010.PDF—web tutorial on finding number of nested files and folders as of Nov. 25, 2012.*
(Continued)

*Primary Examiner* — Tuyetlien T Tran
(74) *Attorney, Agent, or Firm* — Merchant & Gould P.C.

(57) ABSTRACT

Navigation of multiple information item hierarchies within a same application display pane or view is provided. Information items may be displayed in a customized collection of information items, for example, a "favorites" collection, that may be assembled from a variety of content sources and that may be persisted across a variety of information item views.

16 Claims, 19 Drawing Sheets

(56) References Cited

U.S. PATENT DOCUMENTS

| | | | |
|---|---|---|---|
| 8,181,119 B1* | 5/2012 | Ording | G06F 9/4443 |
| | | | 715/810 |
| 8,447,756 B2 | 5/2013 | Tschanz | |
| 2004/0205625 A1 | 10/2004 | Banatwala et al. | |
| 2004/0205633 A1 | 10/2004 | Martinez et al. | |
| 2004/0267600 A1* | 12/2004 | Horvitz | G06F 17/30873 |
| | | | 705/7.31 |
| 2005/0144555 A1 | 6/2005 | Morris | |
| 2005/0283742 A1* | 12/2005 | Gusmorino et al. | 715/839 |
| 2005/0289109 A1* | 12/2005 | Arrouye | G06F 17/301 |
| 2005/0289155 A1* | 12/2005 | Nan | G06F 9/4443 |
| 2006/0036568 A1* | 2/2006 | Moore et al. | 707/1 |
| 2007/0061745 A1 | 3/2007 | Anthony et al. | |
| 2007/0203920 A1* | 8/2007 | Bertram et al. | 707/100 |
| 2008/0165147 A1* | 7/2008 | Christie | G06F 1/1626 |
| | | | 345/173 |
| 2009/0125845 A1* | 5/2009 | Lacock | G06F 3/0482 |
| | | | 715/841 |
| 2010/0251085 A1 | 9/2010 | Zearing et al. | |
| 2010/0269070 A1* | 10/2010 | Kim | G06F 17/30274 |
| | | | 715/838 |
| 2010/0312754 A1* | 12/2010 | Bear et al. | 707/685 |
| 2011/0106846 A1 | 5/2011 | Matsumoto et al. | |
| 2011/0252373 A1* | 10/2011 | Chaudhri | G06F 3/04817 |
| | | | 715/835 |
| 2011/0307460 A1 | 12/2011 | Vadlamani et al. | |
| 2012/0185800 A1* | 7/2012 | Hart | G06F 3/04817 |
| | | | 715/810 |
| 2013/0080900 A1* | 3/2013 | Wilde | G06F 17/30893 |
| | | | 715/736 |
| 2013/0332311 A1* | 12/2013 | Pu | G06Q 30/0641 |
| | | | 705/26.8 |

FOREIGN PATENT DOCUMENTS

| | | |
|---|---|---|
| CN | 102119386 | 7/2011 |
| CN | 102279869 | 12/2011 |
| EP | 2244196 | 10/2010 |
| EP | 2244196 A1 | 10/2010 |

OTHER PUBLICATIONS

"Adobe Bridge", Published on: Apr. 14, 2009, Available at: http://adobe-bridge.software.informer.com/.

"Windows Directory Statistics", Published on: Aug. 21, 2010, Available at: http://windirstat.info/.

International Search Report and Written Opinion for Application No. PCT/US2013/077172 dated Mar. 13, 2014.

Chinese Office Action for Application No. 201380067706.6, dated Feb. 27, 2018, 12 pages.

"Office Action Issued in European Patent Application No. 13826816.4", dated May 31, 2018, 9 Pages.

* cited by examiner

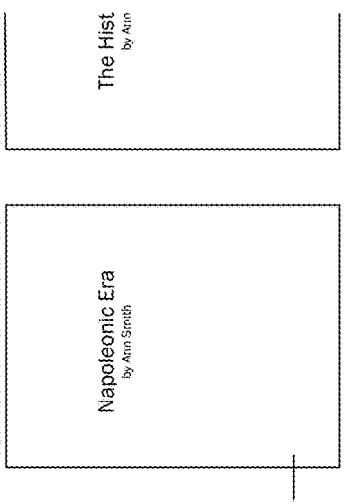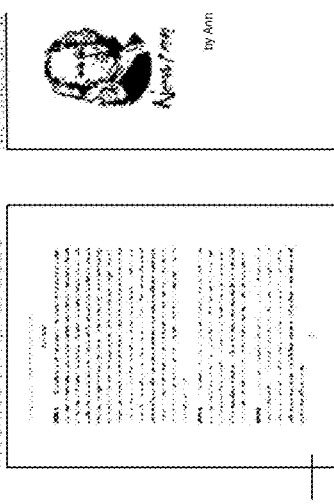
FIG 8

FIG 10

← Recent   Browse
ALL WORD POWERPOINT EXCEL

☆ Favorites —— 805

| School Life
Modified on Jan 3, 2017

| Research Paper
Modified on Jan 13, 0017

| Contract
Modified on Jan 13, 0017

| News&Print
Modified on July 15, 2016

▦ Today —— 910

| Title Slide Deck
Modified on May 5, 2021

| Work Contract
Modified on May 5, 2021

| Home Loan
Modified on May 5, 2021

| Resume
Modified on May 5, 2021

| Class Notes
Modified on May 5, 2021

▦ Last Week —— 1020

| Work Contract
Modified on May 1, 2021

| Solid Design Th...
Modified on April 29, 2021

| Stunning
Modified on May 2, 2021

| Christina's Doc
Modified on April 29, 2021

| News&Print
Modified on April 30, 2021

| Resume
Modified on May 1, 2021

| Title Slide Deck
Modified on April 30, 2021

| Contract
Modified on May 2, 2021

1025
▦ La

| Class Notes
Modified on May 1, 2021

| Stunning
Modified on April 29, 2021

| News&Print
Modified on April 28, 2021

| Work
Modified

| Chris
Modified

| Stun
Modified

| New
Modified

| Resu
Modified

| Title
Modified

| Cont
Modified

| Clas
Modified

FIG 13

NAVIGATING CONTENT HIERARCHIES AND PERSISTING CONTENT ITEM COLLECTIONS

BACKGROUND

In traditional content storage systems, content or information items, for example, word processing documents, slide presentations, spreadsheets, notes, and the like, may be organized and grouped to allow users to parse the groupings when searching or browsing for one or more stored items. According to one approach, such information items may be grouped in folders, and some items may be grouped in folders nested within other folders. Unfortunately, it can be difficult to determine the contents of a given folder without opening the folder and any folders nested within the folder. In addition, items residing in a given folder are secluded from items residing in other folders making it difficult to consider different items outside the context of their respective folders.

Information items grouped together in such a manner may typically be viewed according to one or more sorting methods, for example, alphabetically, date accessed, most recently modified, and the like. However, such viewing or sorting methods do not allow users to view information item sets or collections, for example, a favorite content items set, in a persistent collection relative to other information items.

It is with respect to these and other considerations that the present invention has been made.

SUMMARY

Embodiments of the present invention solve the above and other problems by providing navigation of multiple information item hierarchies within the same application display pane or view, and by providing a display of a customized collection of information items, for example, a "favorites" collection, that may be assembled from a variety of content sources and that is persisted across a variety of information item views.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention.

FIG. 8 illustrates a customized or "favorites" collection of information items created according to different applications and persisted together as a collection of information items.

FIG. 10 illustrates a display of a customized or "favorites" collection of information items relative to a display of other information items wherein the other information items are displayed according to an example "Today," "Last Week," "Last Month," and so on time scale.

FIG. 13 is an illustration of a display of a customized collection of information items relative to a display of other information items showing additional information displayed in association with the displayed collection of information items.

DETAILED DESCRIPTION

Figure 1:
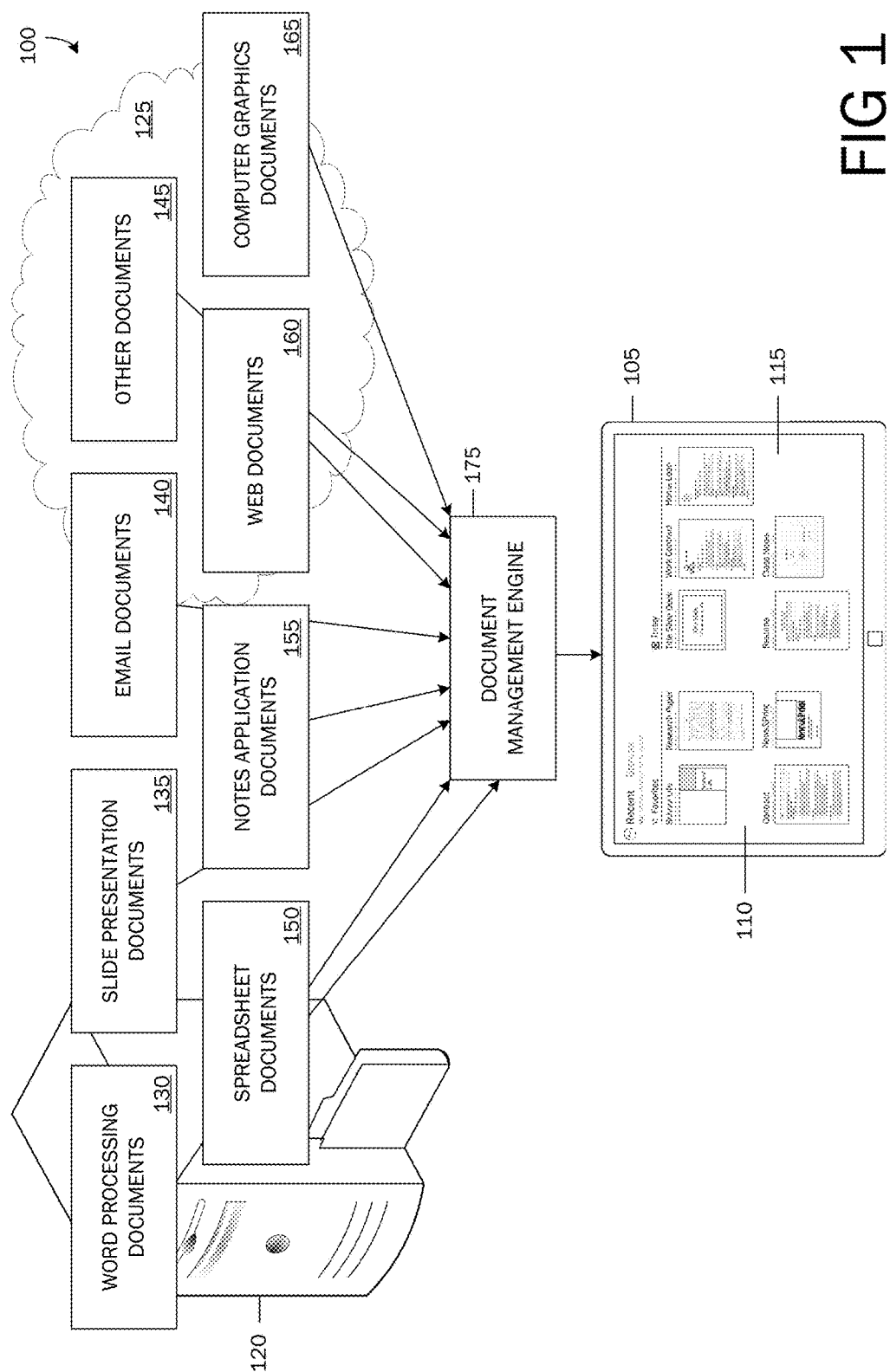
FIG. 1 illustrates a system architecture for assembling one or more information items into a collection of information items that may be persisted across a variety of information item views.

As briefly described above, embodiments of the present invention are directed to providing navigation of multiple information item hierarchies within the same application display and to providing a display of a customized collection of information items that may be assembled from a variety of content sources and that may be persisted across a variety of content item views. According to one embodiment, navigation of multiple information item hierarchies within a same application display allows users to see information items exposed at a top level. Instead of exposing information items via discrete repositories, for example, folders, information items may be exposed as collections of information items. The collections of information items may include visualizations of associations between information items contained in a collection as well as visualizations of a number of additional items a given collection may contain and a number of additional collections that may be nested within a given collection. Collections may have a variety of different representations for the items contained therein including thumbnail visualizations, names of items, attributes associated with items (e.g., number of comments associated with items), and the like. As a user selects a given displayed collection of information items, the contained information may be exposed in and displayed in line with other information items contained in the selected collection. That is, exposed and displayed additional information items do not replace the display of previously displayed information items, thus eliminating the need to "drill down" into the collection of information items.

According to another embodiment, a display of a customized collection of information items, for example, a "favorites" collection may be provided. Information items assembled into a customized collection may be created and/or edited according to a variety of different software applications, for example, word processing applications, spreadsheet applications, slide presentation applications, notes applications, and the like. The display of the customized collection of information items may be persisted across a variety of information item views relative to views of other information items. For example, the display of a "favorites" collection of information items may be displayed in an application display view in a persistent manner relative to other information items, for example, items displayed by date created, items displayed alphabetically, other groupings of items, and the like.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, FIG. 1 illustrates a system architecture 100 for assembling one or more information items into a collection of information items that may be persisted across a variety of information item views. As illustrated in FIG. 1, information items, for example, word processing documents 130, slide presentation documents 135, electronic mail documents 140, spreadsheet documents 150, notes application documents 155, Internet-based functionality documents and/or content items 160, computer-generated graphics documents 165, other documents of a wide variety 145, and the like may be stored at and/or obtained from a variety of local and remote sources and may be grouped together in one or more collections 110, 115 as desired by a given user. Computer-generated graphical representations of the collections of information items 110, 115 may be displayed on a display surface of a computing device 105, for example, the tablet-type computing device 105 illustrated in FIG. 1 for allowing a user to visualize his/her collections of information items for launching individual information items, and for managing the information items contained in one or more collections. Such graphical representations may include thumbnail sketches, images, photographs, text-based identifications, and the like for representing and/or identifying the actual stored information items associated with the graphical representations of the items displayed to the user. As should be appreciated, selection of a given graphical representation may cause a launch of a software application associated with the underlying information item (e.g., a word processing application) and a display of the underlying information item.

As illustrated in FIG. 1, the information items grouped into one or more collections 110, 115 may be stored at and/or obtained from a variety of local and remote sources, for example, a local or remote server 120, or from one or more distributed computing networks, for example, the cloud-based or Internet-based computing network 125, illustrated in FIG. 1. The document management engine 175 is illustrative of a software application containing sufficient computer executable instructions for assisting a user in grouping together one or more information items into one or more collections of information items and for displaying graphical representations of collections of information items and individual information items and/or nested or additional information items contained therein.

Figure 2:
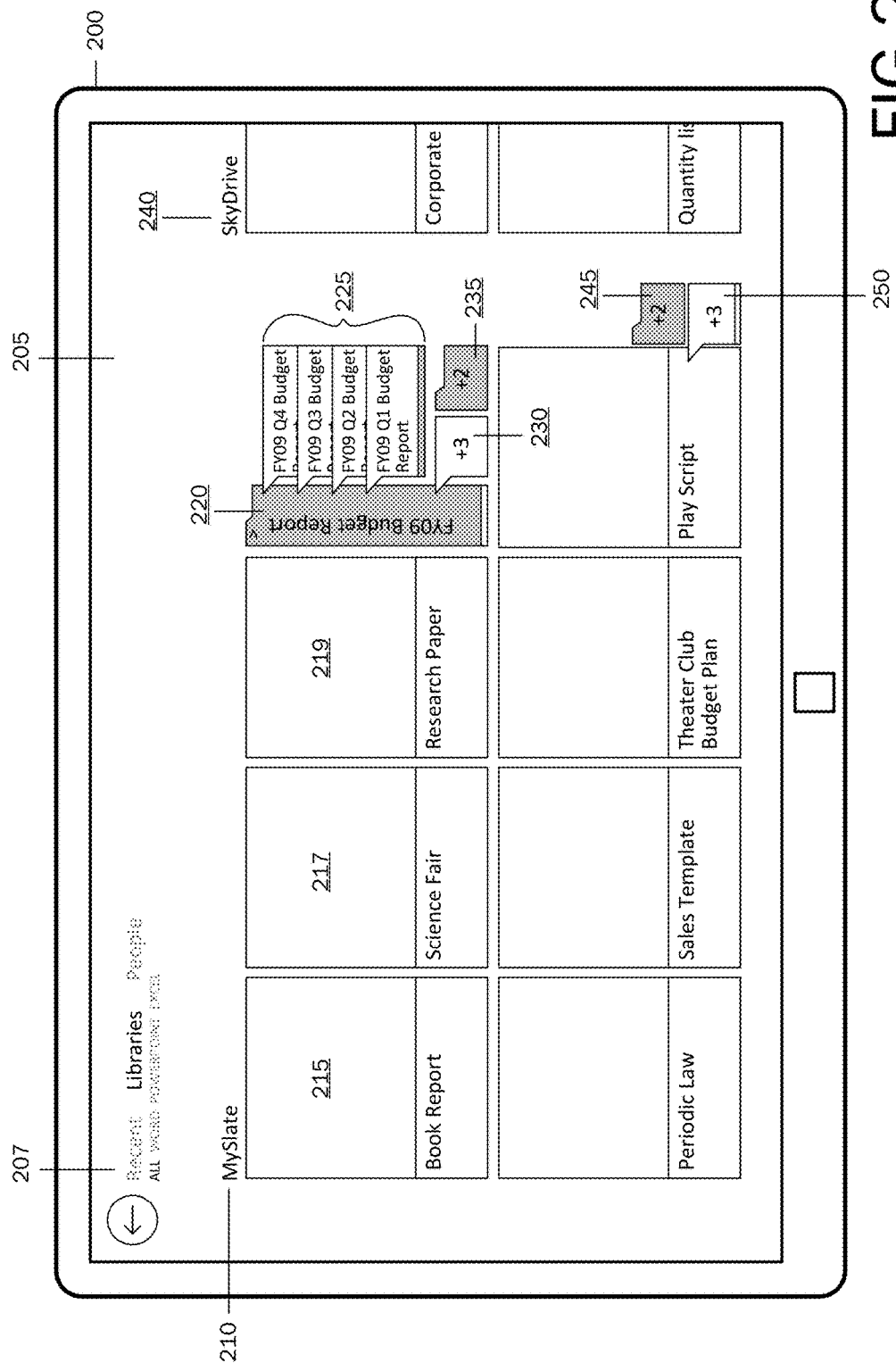
FIG. 2 is a view or visualization of a number of content or information items displayed as collections of information items that may be navigated via a single display view.

FIG. 2 is a view or visualization of a number of content or information items displayed as collections of information items that may be navigated via a single display view. The displayed collection of 210 of content items, illustrated in FIG. 2, is displayed on a display surface 205 of an example tablet computing device 200. As should be appreciated, the tablet-type computing device 200 is illustrative of any suitable computing device with which the collection of information items may be displayed. Other suitable computing devices include desktop computing devices, laptop computing devices, mobile computing devices, handheld computing devices, smartphones, and the like.

Referring still to FIG. 2, two information item collections 210 and 240 are illustrated in an "in-line" display orientation where a number of information items contained in the collection 240 are not exposed to view, but that may be exposed by scrolling the displayed information items in a right to left manner that will move the displayed collection 210 off screen to the left for exposing the collection of information items 240 to view. As should be appreciated, the information items displayed on the display surface 205 similarly may be navigated in an up and down manner by scrolling the content items upward or downward to expose other displayed information items displayed above or below the illustrated collections 210 and 240. One or more navigation controls 207 are illustrated for selecting different collections of information items by different collection types, by different content types, or by any other suitable sorting or navigation attribute.

Referring still to FIG. 2, the information item collection 210 includes visualizations (graphical representations) of a variety of different information items, for example, documents 215, 217, 219, etc. According to embodiments, the visualizations 215, 217, 219 may be displayed according to a variety of graphical representations including thumbnail sketches, images, names of items, attributes associated with items (e.g., number of comments applied to one or more items), and the like. For example, each of the visualizations 215, 217, 219 includes a title or name associated with the respective information items.

Information items assembled together as collections 210, 240 may be related to each other according to a variety of relationships, including hierarchical relationships. That is, information items assembled together may be related according to a context (e.g., all items associated with a given work project) and individual items and/or additional collections of items may be hierarchically related to other information items and/or collections of items. For example, the collection 210, illustrated in FIG. 2, may include documents associated with a construction project, and one or more additional items or nested collections of items may be associated with tasks or sub-projects of the construction project.

Referring still to FIG. 2, in addition to individual information items 215, 217, 219, a nested collection 220, for example, the "FY09 budget report" collection 220 is illustrated as part of the overall collection 210. On the right side of the nested collection 220 four additional items 225 are represented in association with the nested collection 220. The additional items icon 230 indicates that three additional files are associated with the nested collection 220 and that may be exposed to the user by selection of the icon 230. The additional nested collection icon 235 indicates that two additional nested collections are associated with the nested collection 220. The additional nested collection icon 245 indicates that two additional nested collections are associated with the overall collection 210, and the additional information items icon 250 indicates that three additional files may be exposed in association with the overall collection 210.

Figure 3:
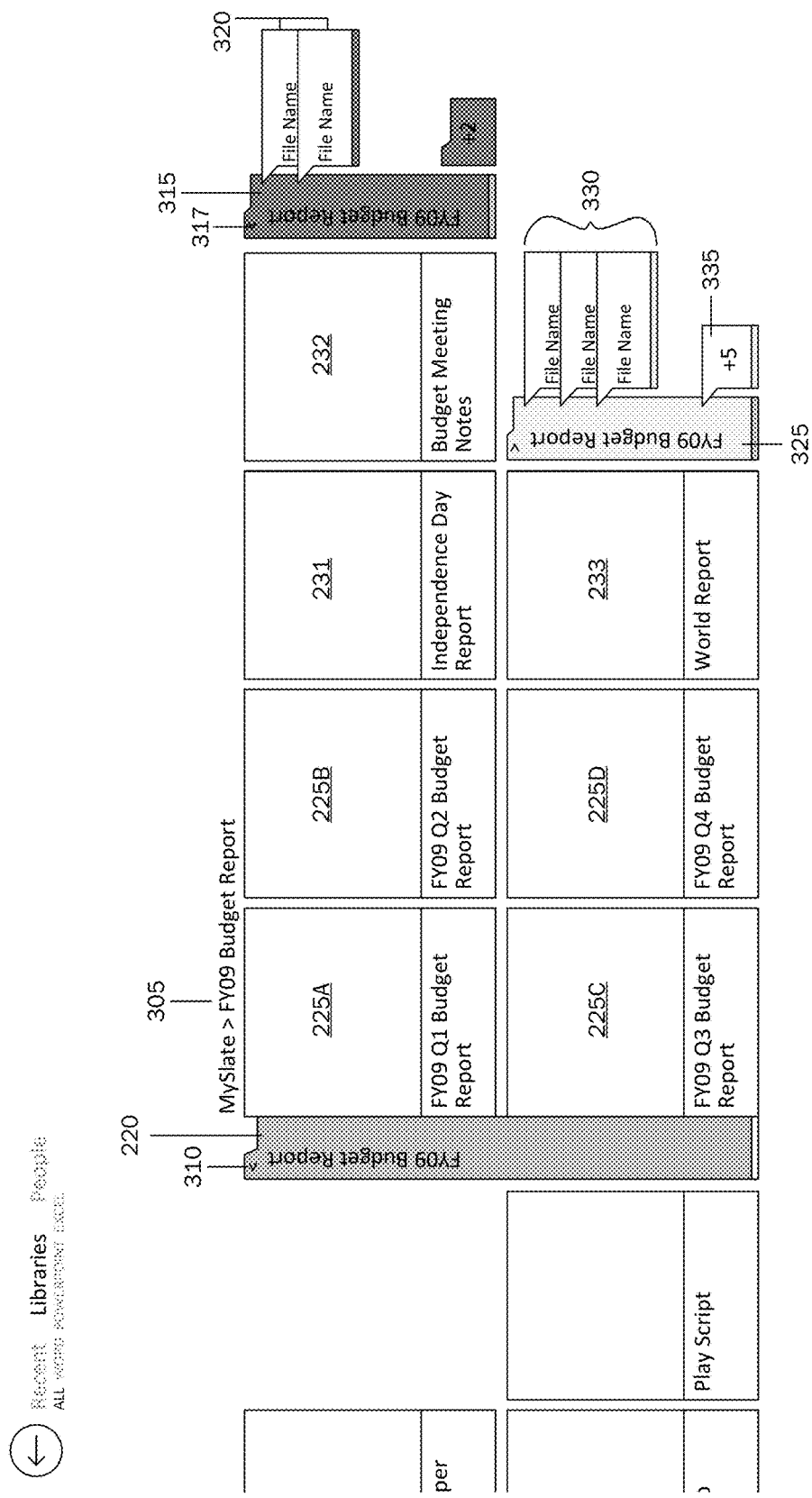
FIG. 3 is an illustration of the information item collection illustrated in FIG. 2 wherein a nested collection is illustrated in an expanded view.

Referring now to FIG. 3, upon selection of the nested collection representation control/icon 220 (FIG. 2), the four additional information items 225 (FIG. 2) are displayed as information item representations 225A, 225B, 225C and 225D (FIG. 3). Selection of the additional information items icon 230 (FIG. 2) causes exposure of information item representations 231, 232, 233 (FIG. 3) in line with other information items associated with the "FY09 budget report" nested collection 305. Selection of the additional nested collection icon 235 (FIG. 2) causes exposure of the two additional nested collections 315, 325, illustrated in FIG. 3. That is, selection of these icons (or other similar icons such as the +2 icon 245 and the +3 icon 250) causes exposure and display of more information items in the example "MySlate" collection 210.

Once the additional nested collections 315, 325 are exposed and displayed, as illustrated in FIG. 3, additional information items 320, 330 are illustrated that may be similarly exposed in line relative to other exposed information item visualizations associated with the overall collection 210, illustrated in FIG. 2. Thus, as each nested collection, folder, or represented information item is selected in association with a given collection 210 of information items, a display of visualizations for exposed information items is displayed "in-line" with other information items contained in the same collection of information items to allow a user to readily appreciate the contents of the collection 210, and any relevance or hierarchical relationship between information items contained in the collection 210 without requiring the user to open and close or "drill-down" into one or more folders looking for desired information items.

Referring still to FIG. 3, according to an embodiment, when more information items are exposed and displayed by selection of an icon such as the additional information icons 230, 235, 245, 250, 335 as described above, such additional information items may be collapsed back out of view as illustrated in FIG. 2, if desired. As illustrated in FIG. 3, a chevron or other similar selectable control 310, 317 may be provided which when selected may cause a collapse of associated displayed information items back to a pre-display view as illustrated in FIG. 2. Alternatively, instead of selection of a selectable control 310, 317, a selection, for example, via a tap, of a collection representation control or icon 220, 315 may likewise cause a collapsing of the exposed and displayed additional information items.

Figure 4:
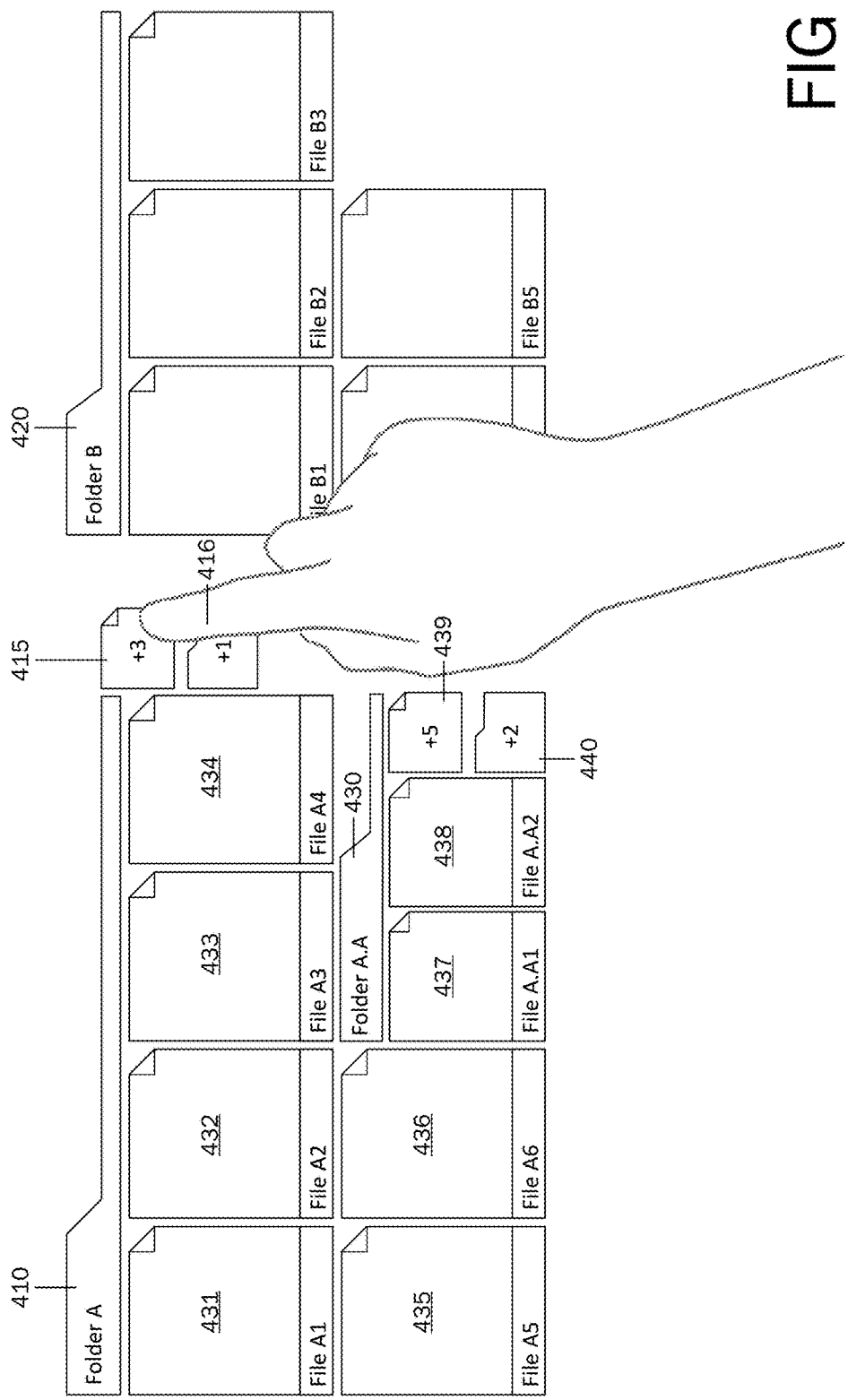
FIG. 4 is a view or visualization of a number of content or information items displayed as collections of information items that may be navigated via a single display view.

FIG. 4 illustrates a first collection of information items 410 and a second collection of information items 420. The first collection of information items 410 illustrated as "Folder A" contains items 431, 432, 433, 434, 435, 436 indicating the association of five information items with the collection 410. An additional information items icon 415 illustrating that three additional information items are associated with the overall collection 410 and a nested collection icon 416 indicating that one nested collection is associated with the overall collection 410 are also illustrated. In addition, a nested collection 430 containing two displayed information items 437 and 438 is illustrated in association with the overall collection 410. The icons 439 and 440 indicate that a number of additional information items and a number of nested collections may be exposed in association with the nested collection 430.

Figure 5:
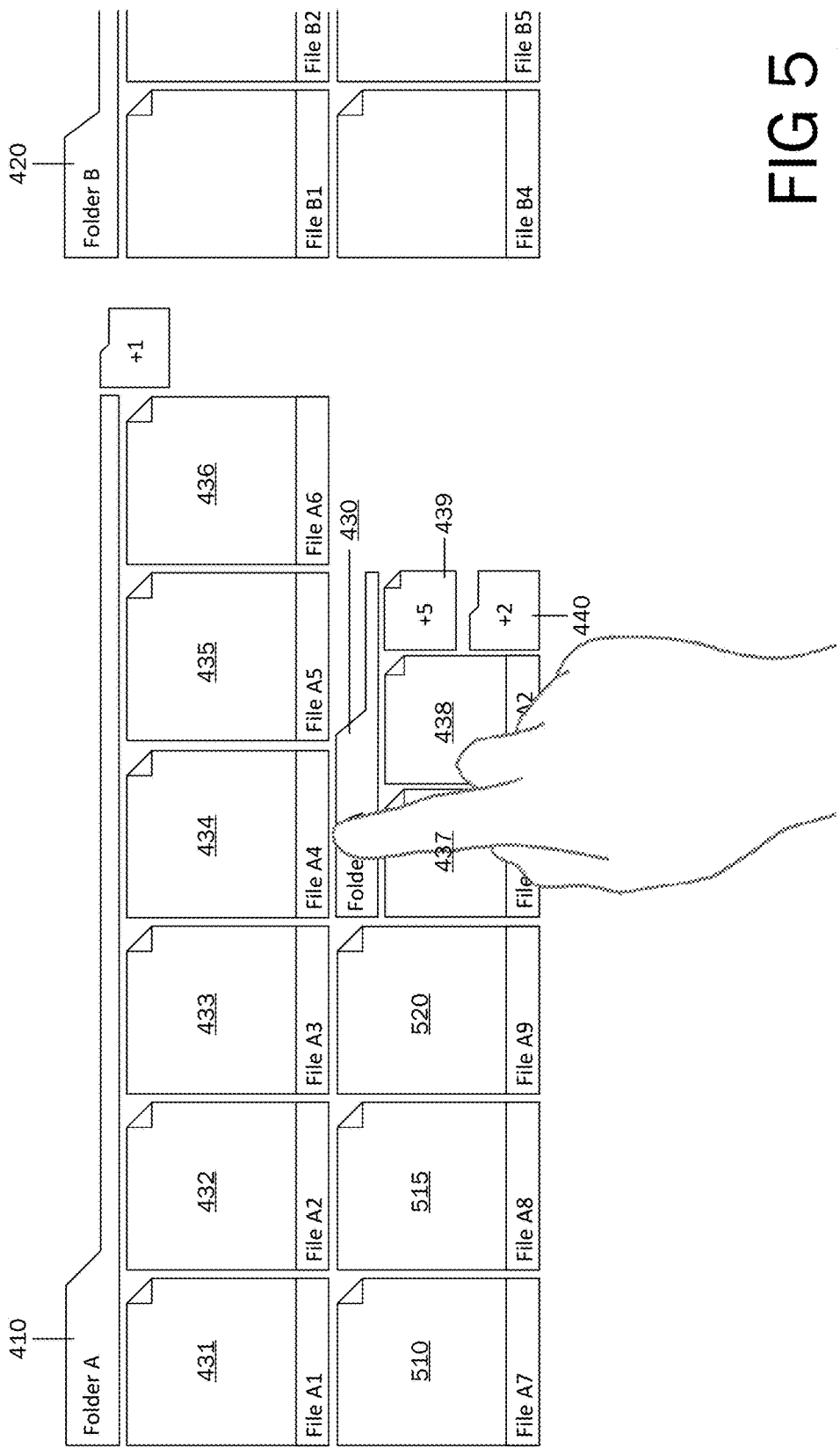
FIG. 5 is an illustration of the information item collection illustrated in FIG. 4 wherein a nested collection is illustrated in an expanded view.
Figure 6:
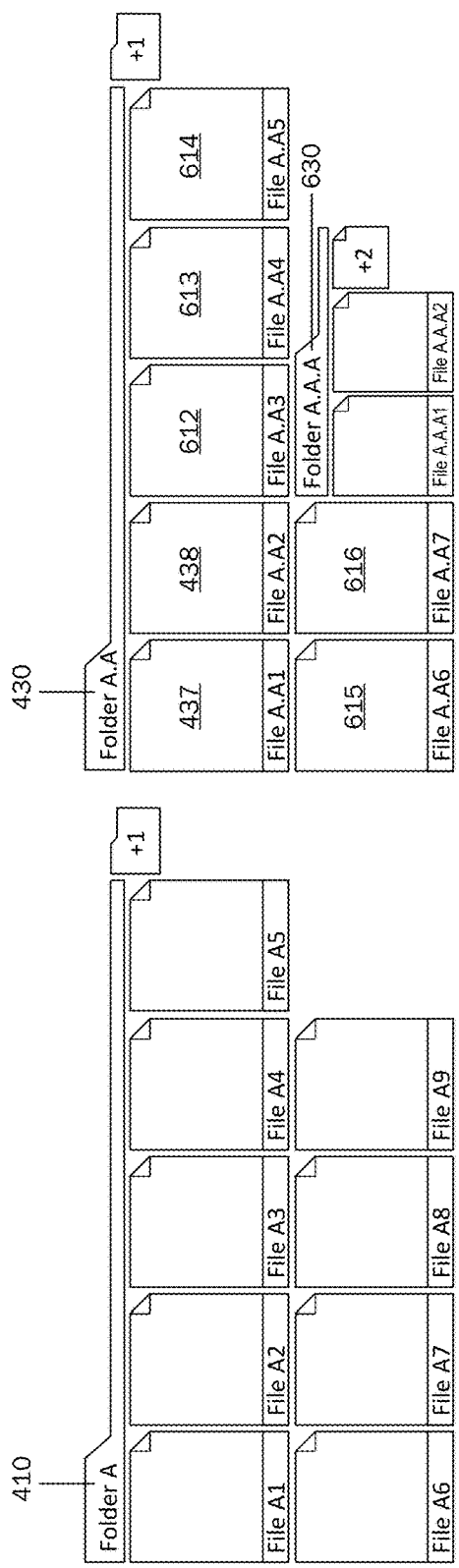
FIG. 6 is an illustration of the information item collection illustrated in FIG. 5 wherein a nested collection is illustrated in an expanded view.

Referring now to FIG. 5, selection of the additional information items icon 415, illustrated in FIG. 4, causes a display of information item visualizations 510, 515, 520 in association with the overall collection 410. Referring to FIG. 6, selection of the nested collection folder 430, as illustrated in FIG. 5, causes a display of one or more information items contained in the nested collection 430 along with a pair of information items associated with the nested collection 430. Selection of the additional information items icon 439, illustrated in FIG. 4, causes a display of the additional information items 612, 613, 614, 615, 616, as illustrated in FIG. 6. Selection of the additional nested collection icon 440, illustrated in FIG. 4, causes a display of a visualization of an expanded nested collection 630 (FIG. 6) illustrated in association with the nested collection 430.

Figure 7:
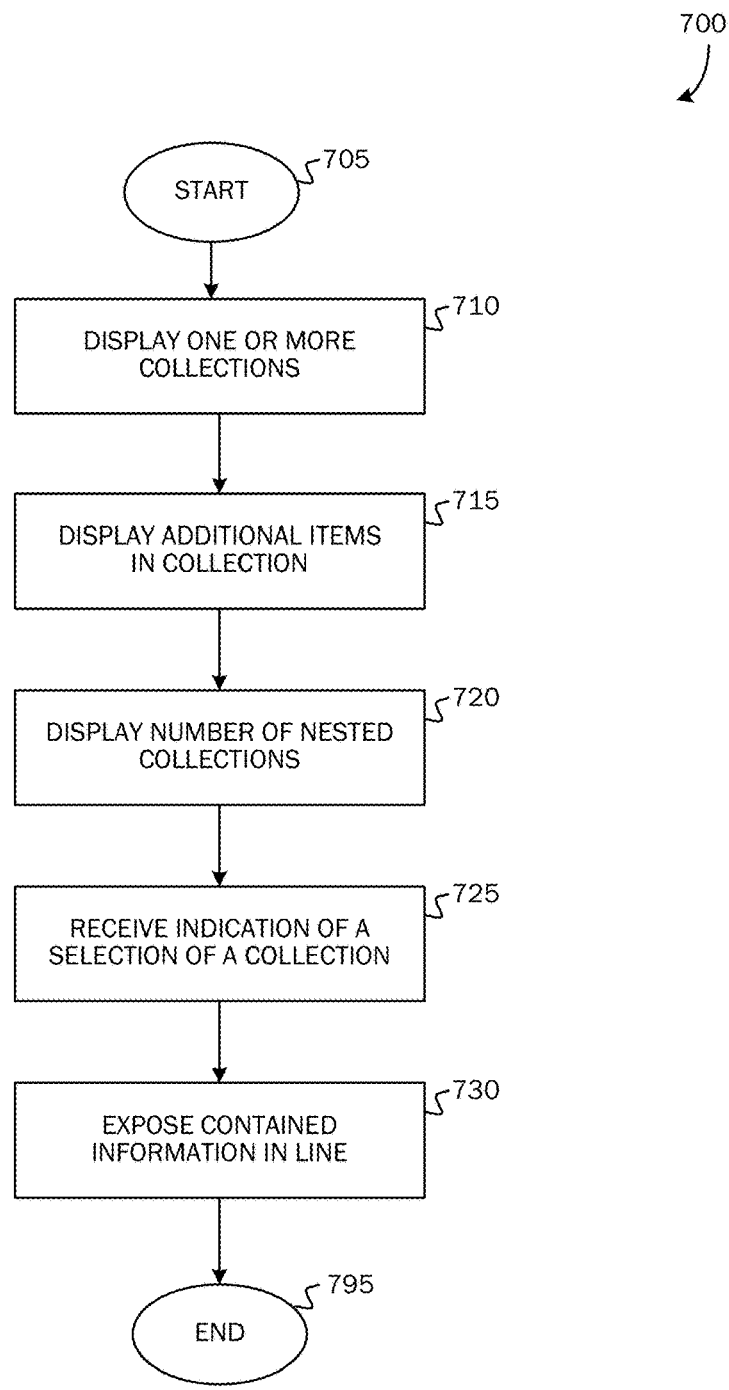
FIG. 7 is a flow chart illustrating a navigation of multiple information item hierarchies within a same application display.

FIG. 7 is a flow chart illustrating navigation of multiple information item hierarchies within a same application display. The method 700 begins at start operation 705 and proceeds to operation 710 where one or more collections of information items are displayed, as illustrated in FIG. 2. For example, a first collection of information items may include all documents, data, images, objects, and the like associated with a first project. Another collection of information items may include all documents, data items, images, objects, and the like associated with a second project, and so on.

At operation 715, if additional information items are associated with a displayed collection of information items but for which individual representations are not displayed, additional information icons 320, 330, 415, 439 may be displayed in association with the collection for illustrating to a user that selection of one or more of these icons may cause a display of a representation, for example, a document representation, an image, a thumbnail sketch, or other suitable representation of an associated information item.

At operation 720, if any nested collections are associated with a given displayed collection, an icon 220, 315, 325 illustrating the presence of one or more nested collections associated with the displayed information item collection may be illustrated for indicating to a user that selection of one or more of the nested collection icons will cause display of representations of information items contained in the selected nested collections.

At operation 725, an indication of a selection of an additional information item icon or of a nested collection icon is received, and at operation 730, graphical representations associated with additional information items or graphical representations associated with nested information items may be exposed in an "in-line" manner, as illustrated in FIGS. 2 through 6. The method 700 ends at operation 795.

As illustrated and described above with reference to FIGS. 1 through 7, displaying information items in collections of information items and allowing a subsequent display in an "in-line" manner of additional associated information items and/or nested collections of information items allows for an exposure of representations of one or more information items in a single application display and allows a user to quickly and easily navigate through multiple information item hierarchies and associations. Moreover, a collection of documents or other content/information items generated by and/or edited by a variety of different software applications and stored across a variety of different storage locations may be represented in an easy to navigate view that does not require a user to open and close (and "drill down") into one or more folders seeking a desired item.

FIG. 8 illustrates a customized or "favorites" collection of information items created according to different applications and persisted together as a collection of information items. As illustrated in FIG. 8, two separate collections 805, 830 of information items 810, 815, 820, 825, 835, 840 are illustrated on a display surface of a computing device, for example, the computing device 105 illustrated in FIG. 1. According to an embodiment, the collection of information items 835, 840 is only partially displayed with a portion of the collection 830 being "off the page" where the entire collection 830 will not fit on the present display configuration of the collections 805, 830. As should be appreciated, the collections 805, 830 may be scrolled in a right to left manner or in an up or down manner to expose additional information items or additional collections of information items to the right or left of the displayed collections or above or below the displayed collections.

According to embodiments, a particular customized collection of information items may be generated by a user, for example, the "favorites" collection 805 illustrated in FIG. 8 for grouping together one or more information items of interest to the user either as favorite information items to the user, or as information items that may be grouped together relative to a given context. For example, the favorites collection 805 may be a collection of images, for example, photographs, sketches, or the like that are favorite images of the user, or the collection 805 may be a collection of word processing documents, spreadsheet documents, slide presentation documents, notes documents, electronic mail documents, and the like associated with a given context, for example, a given project or work team.

In generating a customized or "favorites" collection 805, a user may designate any number of information items for inclusion into the customized collection 805 from any number of remote or local storage sources, as described above with reference to FIG. 1. In addition, the user may apply a variety of graphical representation attributes to the items displayed in the collection. For example, the items may be displayed as thumbnail sketches of the associated items, as illustrated in FIG. 8, the items may be displayed as text-based representations of the associated items, as illustrated in FIG. 10 (described below), the items may be identified by icons associated with the application functionality used for creating the items (e.g., a word processing application icon), or the items may be identified by a variety of customizable images selected by a user (e.g., photographs, clip art, etc.). After information items are displayed in a given customized or "favorites" collection 805, one or more items may be deleted from the collection, one or more additional items may be added to the collection, and items contained in the collection may be rearranged as desired by the user of the collection. In addition, customized or "favorites" collections 805 may include hierarchically associated items that may include nested collections and associated files and folders, as described above with reference to FIGS. 1-7.

Once a particular or customized collection 805 is generated, as illustrated in FIG. 8, the customized collection 805 may be displayed relative to other individual information items or other collections of items such that the customized or "favorites" collection 805 is displayed as a grouping regardless of the display of other information items or collections of information items. For example, the collection 830 illustrated in FIG. 8 may be one of a number of other collections of information items that may be displayed according to a variety of different display properties, for example, displayed by date, displayed by information item type, displayed by most recently accessed, displayed by reviewed versus not reviewed, and the like. Thus, while a number of individual information items and/or collections of information items may be displayed, the customized or "favorites" collection 805 may be persistently displayed as a designated grouping or collection of information items as described herein.

Figure 9:
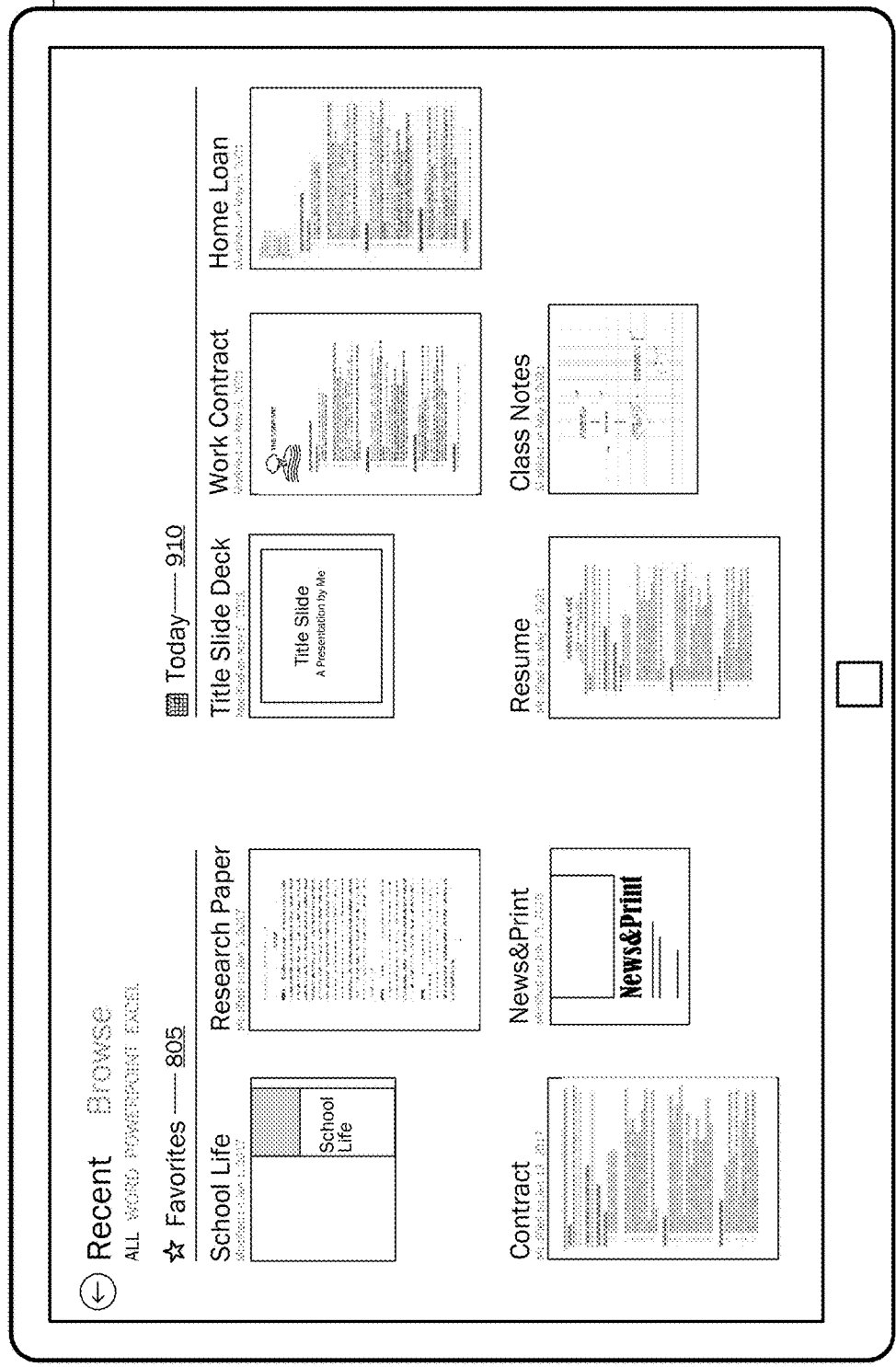
FIG. 9 illustrates a display of a customized or "favorites" collection of information items relative to a display of other information items wherein the other information items are displayed according to an example "Today" time scale.
Figure 11:
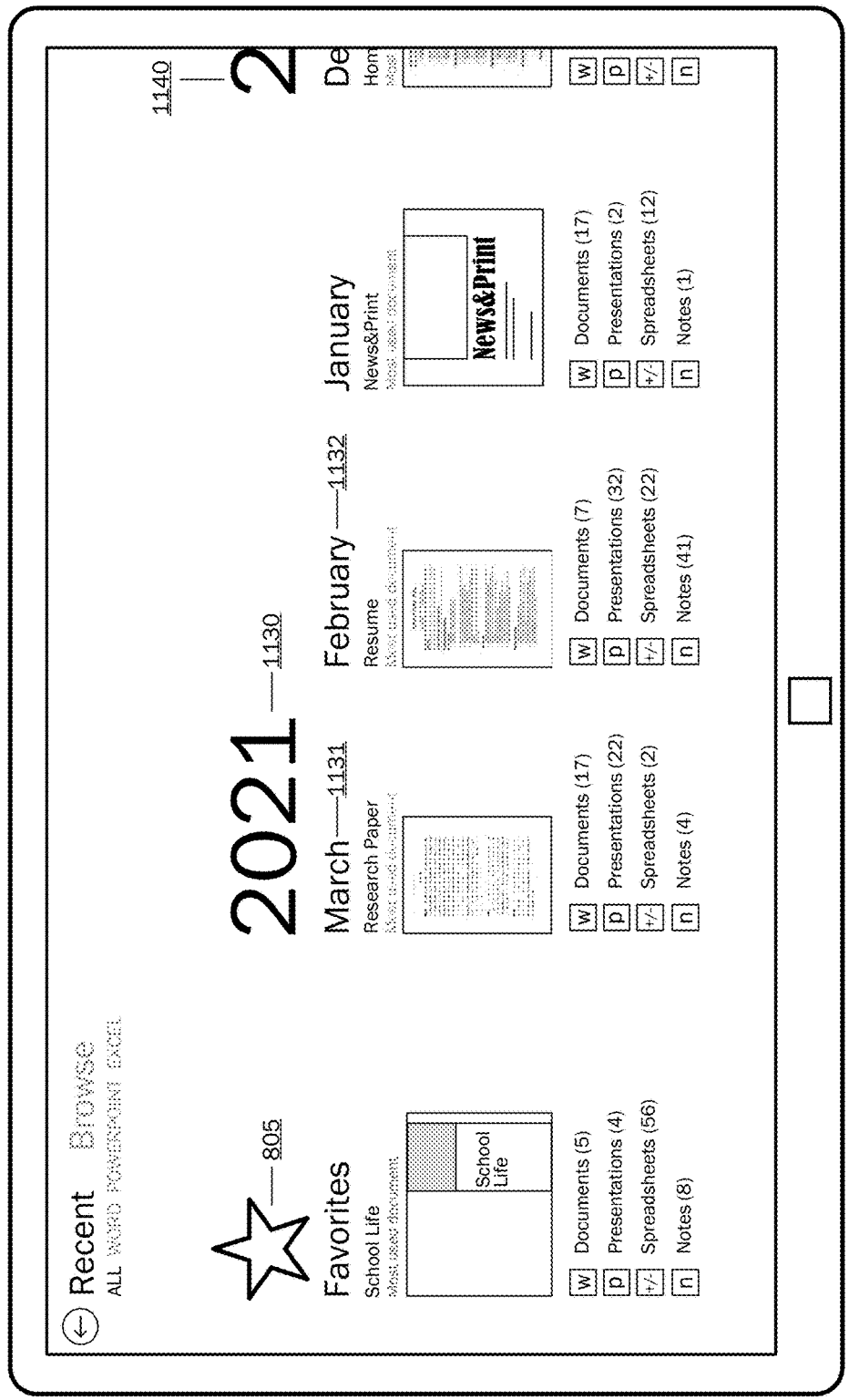
FIG. 11 illustrates a display of a customized or "favorites" collection of information items relative to a display of other information items wherein the other information items are displayed according to an example previous months and previous years/months time scale.

Referring to FIGS. 9, 10 and 11, an illustration of a persistently displayed customized collection of information items 805 relative to other displayed items where the other displayed items are displayed based on date is illustrated. As illustrated in FIG. 9, the customized collection of information items 805 is illustrated as a collection on the left side of the display surface of the computing device 105. A second collection 910 of information items is displayed adjacent to the customized collection 805, and the second collection 910 contains one or more other information items created, edited, or otherwise associated with today's date.

Referring to FIG. 10, the visualization illustrated in FIG. 9 is zoomed out such that the customized collection 805 is illustrated relative to a collection of information items 910 created, edited, or otherwise utilized according to today's date, a second collection of information items 1020 organized according to last week's date, a third collection of information items 1025 organized according to last month's date, and so on. As should be appreciated, the visualization representations illustrated in FIG. 10 are illustrated as information item names or titles as compared to information item thumbnail sketches illustrated in FIG. 9. As described above, as should be appreciated, any of a variety of graphical representations, for example, names/titles, thumbnail sketches, images, alphanumeric designations, and the like may be used for representing a given information item. Importantly, and as illustrated in FIG. 10, the customized or "favorites" information items collection 805 is displayed in a persistent fashion relative to other displayed collections or individual information items such that regardless of the display of other individual items or collections of information items, the customized or "favorites" collection 805 is displayed to the user, as desired.

Referring to FIG. 11, the customized or "favorites" collection 805 is illustrated relative to a further zoomed out view of other collections of information items such that the customized or "favorites" collection 805 is illustrated relative to collections of other information items associated with one or more different months 1131, 1132 and/or years 1130, 1140. As illustrated in FIG. 11, additional ways of graphically representing information items grouped into one or more collections of information items is illustrated. For example, in each collection 805, 1130, 1140 illustrated in FIG. 11, a first information item is illustrated as a thumbnail sketch of the information item, and other information items contained in the respective collections are indicated based on information item types, for example, documents, presentations, notes, etc. along with information indicating the number of each type of information item contained in the respective collections.

Figure 12:
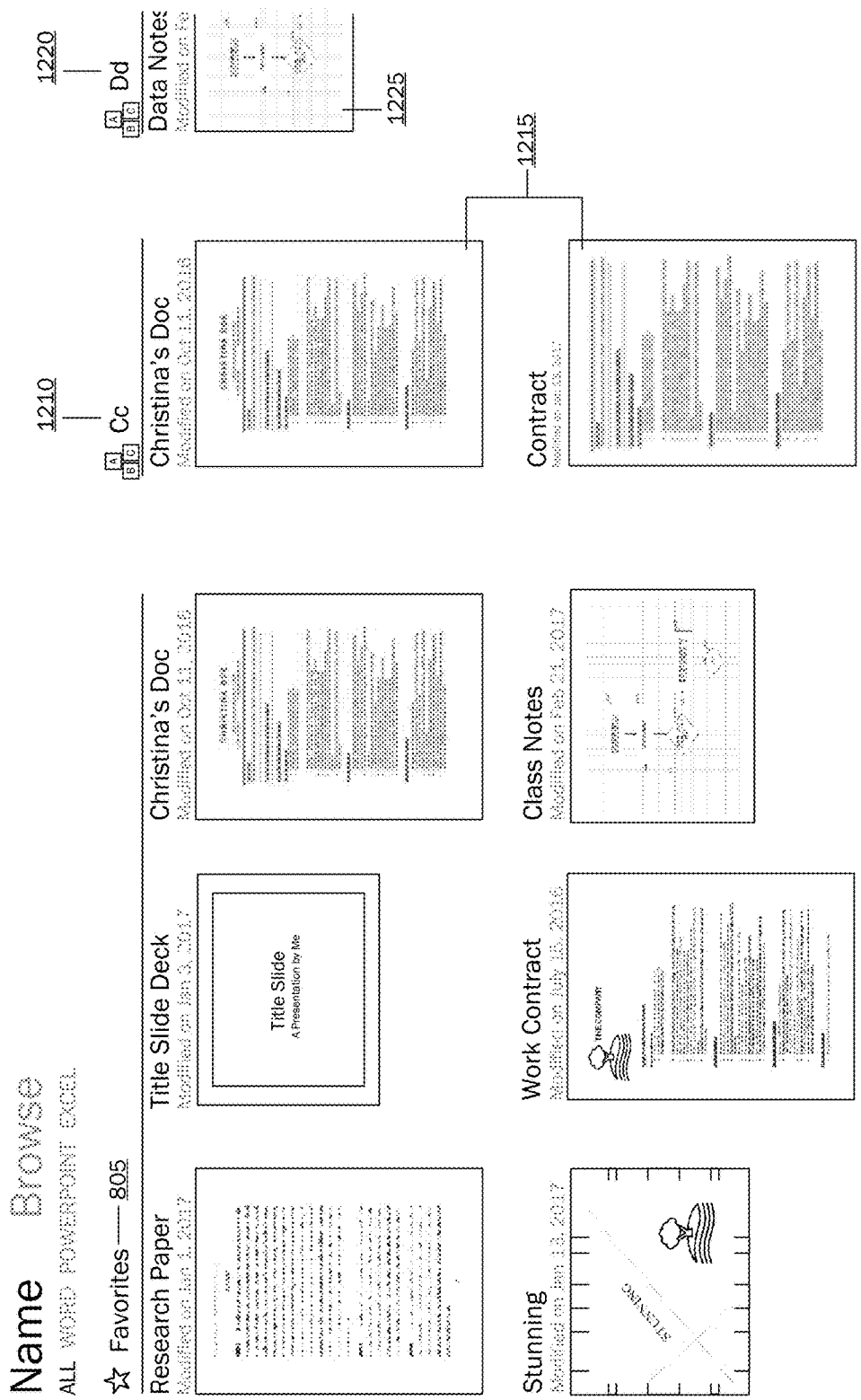
FIG. 12 illustrates a display of a customized collection of information items relative to a display of other information items wherein the other information items are displayed according to alphabetical order.

FIG. 12 illustrates a display of a customized collection of information items relative to a display of other information items wherein the other information items are displayed according to alphabetical order. As illustrated in FIG. 12, customized or "favorites" collection 805 is illustrated as being displayed adjacent to a couple of alphabetically displayed collections 1210, 1220. For example, the collection 1210 includes information items 1215 identified with the letter "C," and the information items 1225 contained in the collection 1220 are identified with the letter "D," and so on.

Figure 13:
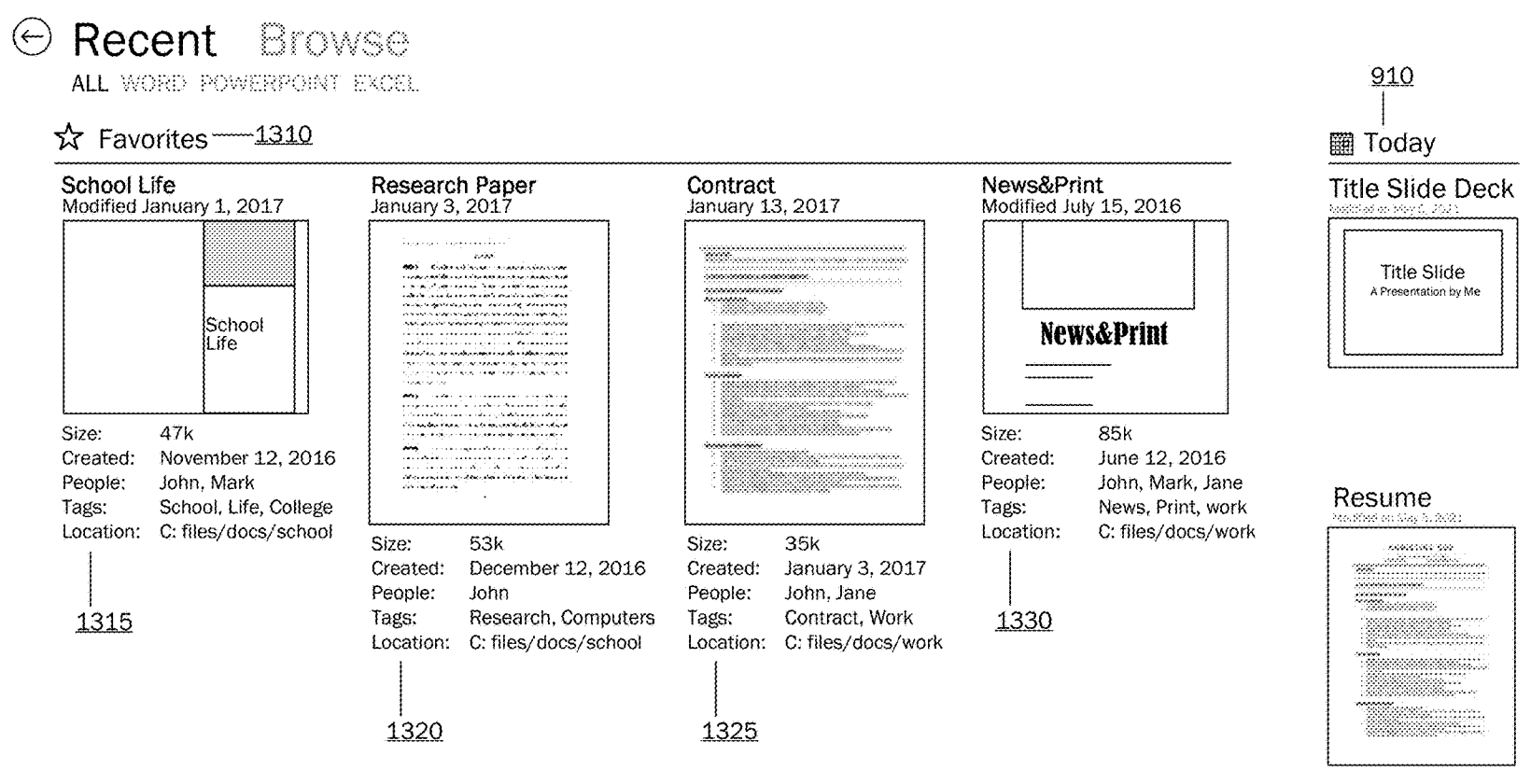

FIG. 13 is an illustration of a display of a customized collection of information items relative to a display of other information items showing additional information displayed in association with the displayed collection of information items. As illustrated in FIG. 13, the graphical representations, for example, thumbnail sketches, titles, or information 1315, 1320, 1325, 1330 associated with information items contained in a customized or "favorites" collection 1310 may be displayed differently from the display of graphical representations for other information items or collections of information items 910 for further distinguishing information items contained in the customized or "favorites" collection 1310. For example, as illustrated in FIG. 13, in addition to the example thumbnail sketches displayed for each of the information items contained in the customized or "favorites" collection 1310, additional information 1315, 1320, 1325, 1330 under each displayed thumbnail sketch, for example, file size, file creation date, file authors, and the like may be provided to further customize and enhance the collection of information items and the display thereof associated with the customized or "favorites" collection 1310.

Figure 14:
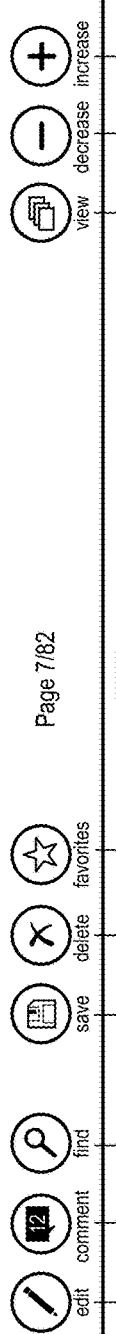
FIG. 14 is an illustration of a displayed document that may be added to a collection of information items.

FIG. 14 is an illustration of a displayed document that may be added to a collection of information items. As illustrated in FIG. 14, a document 1410 is illustrated as being displayed on a display surface of the computing device 105. A number of selectable functionality buttons or controls 1420, 1425, 1430, 1435 are illustrated for providing one or more software application functionalities in association with the displayed document 1410. According to an embodiment, a functionality control 1430 may be provided for allowing a user to automatically add the displayed document 1410 to a customized or "favorites" collection 805, as illustrated and described above with reference to FIGS. 8 through 13. Thus, a document 1410, or other information item being displayed, created, or edited by a user may be automatically included in a collection 805 as desired by a user.

As should be appreciated, selection of the "favorites" button/control 1430 may launch an interactive session for allowing a user to designate a given collection for adding the document 1410 or other similar information item to a desired collection. For example, selection of the button/control 1430 may cause the launching of a user interface component or dialog box to allow a user to search for one of a number of previously created customized or "favorites" collections 805 for selecting a desired collection for adding the document 1410 to the selected collection. As should be appreciated, the buttons/controls 1420, 1425, 1430, 1435 illustrated in FIG. 14 are for purposes of example only and are not limiting of the vast number of different buttons/controls that may be provided for applying one or more functionalities to a document or other information item.

Figure 15:
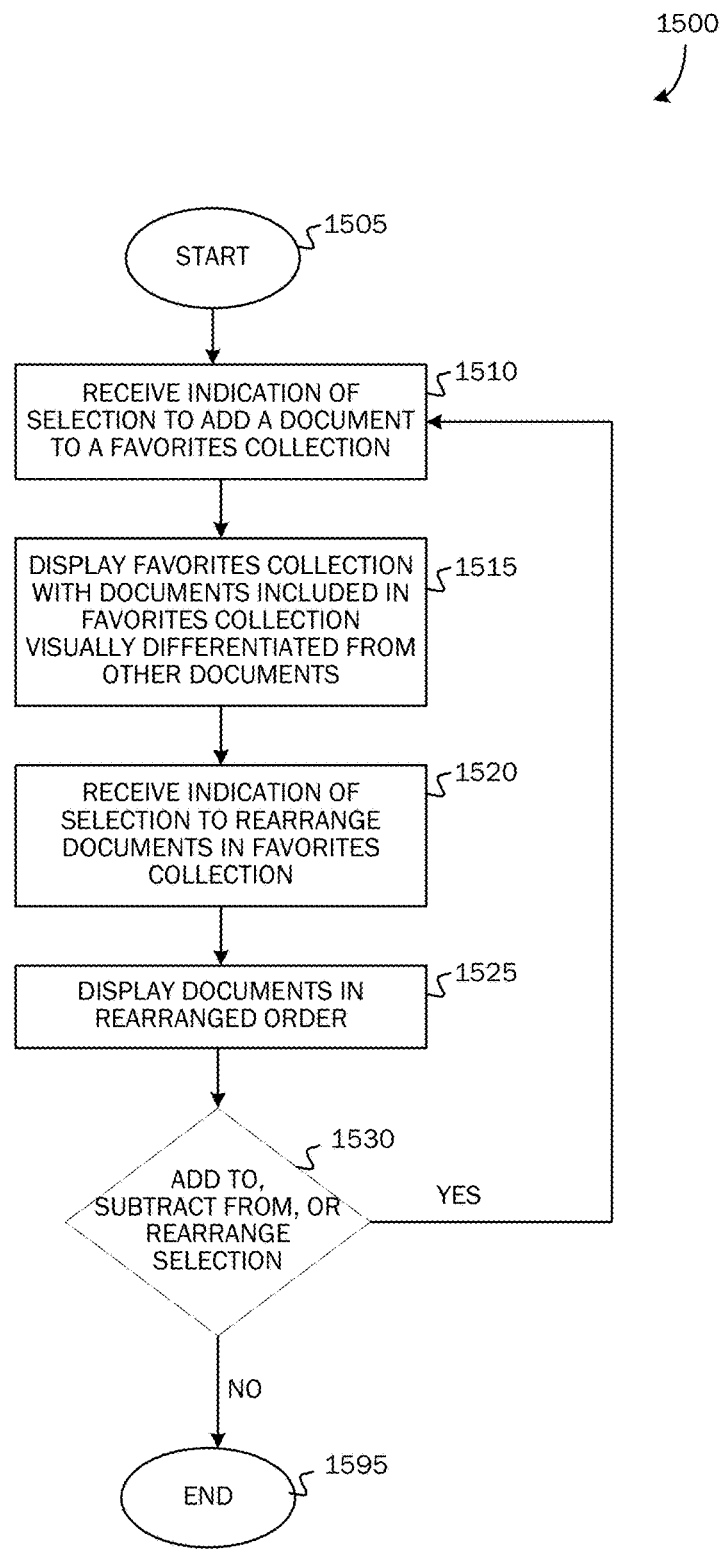
FIG. 15 is a flow chart illustrating a method for providing a display of a customized collection of information items that may be assembled from a variety of content sources and that may be persisted across a variety of information item views.

FIG. 15 is a flow chart illustrating a method 1500 for providing a display of a customized collection of information items that may be assembled from a variety of content sources and that may be persisted across a variety of information item views. The method 1500 begins at operation 1505 and proceeds to operation 1510 where the document management engine 175 receives an indication, for example, a selection, for adding a document or other information item to a given customized or "favorites" collection. As should be appreciated, prior to receiving an indication or selection for adding an information item to a given collection, a user may have previously created a particular customized collection for receiving one or more information items, or the user may have selected a previously generated customized or "favorites" collection for receiving one or more new information items.

At operation 1515, the information items contained in the selected customized or "favorites" collection may be displayed such that the displayed collection or the displayed individual items contained in the collection are differentiated from a display of other individual information items or collections of information items. At operation 1520, an indication or selection may be received by the document management engine 175 for rearranging documents or other information items contained in a given customized or "favorites" collection 805. As described above, at any time desired by a user, a user may rearrange information items displayed in a given customized or "favorites" collection 805 by dragging and dropping or otherwise manipulating the display orientation of the graphical representations of the information items contained in the collection. As should be appreciated, the display of the graphical representations of each of the information items contained in the given collection has no effect on the actual information item stored locally or remotely to which the collection of information items are associated.

At operation 1525, the customized or "favorites" collection information items is displayed as arranged, sorted, or otherwise manipulated by the user. The method repeats back to operation 1510 and allows the user to add to, subtract from, and rearrange 1530 as desired the graphical representations of information items displayed in a given customized or "favorites" collection 805. The method ends at operation 1595.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, IP phones, gaming devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected.

Figure 16:
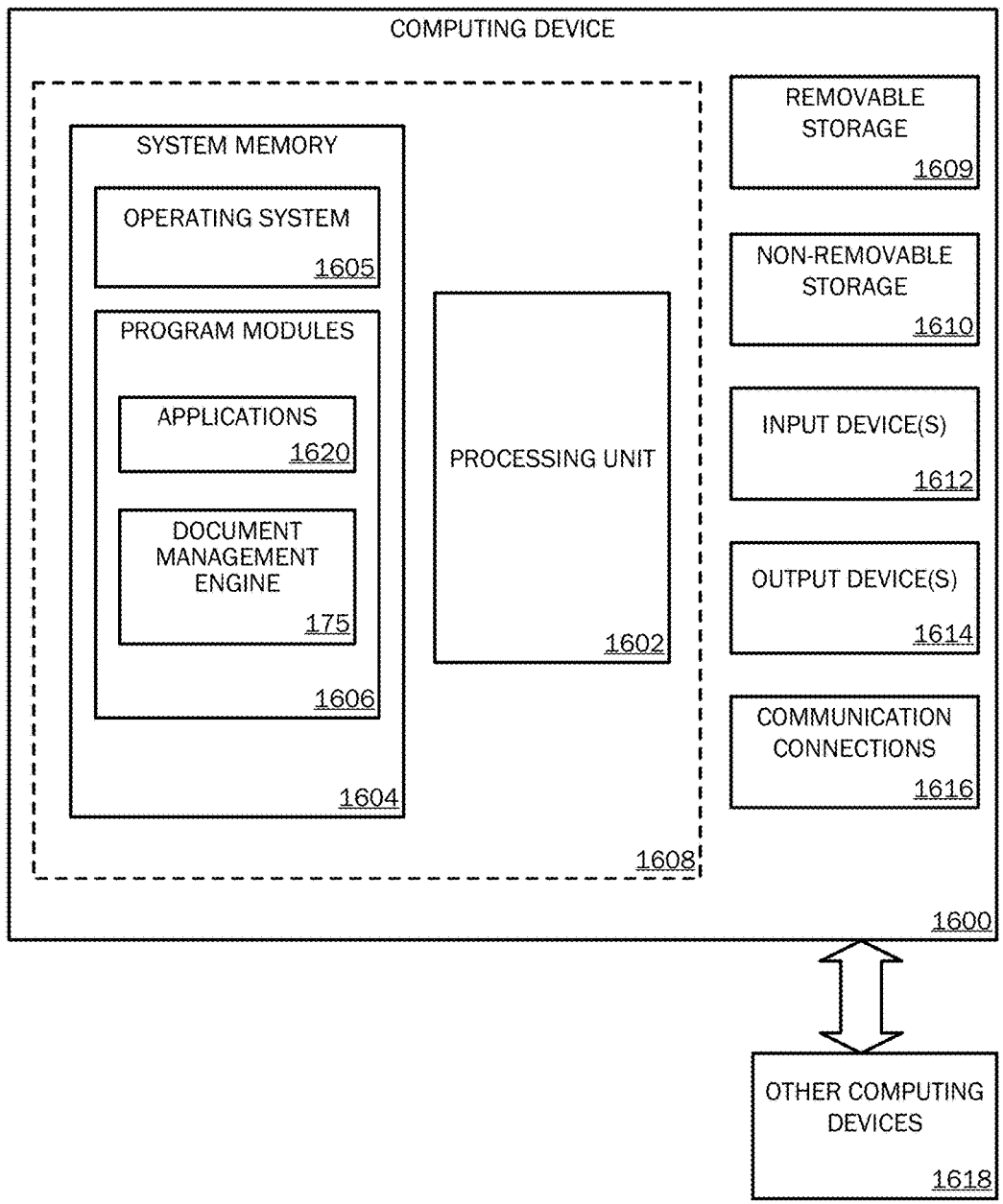
FIG. 16 is a block diagram illustrating example physical components of a computing device with which embodiments of the invention may be practiced.

Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. As described above, gesture entry may also include an input made with a mechanical input device (e.g., with a mouse, touchscreen, stylus, etc.), the input originating from a bodily motion that can be received, recognized, and translated into a selection and/or movement of an element or object on a graphical user interface that mimics the bodily motion. FIGS. 16 through 18 and the associated descriptions provide a discussion of a variety of operating environments in which embodiments of the invention may be practiced. However, the devices and systems illustrated and discussed with respect to FIGS. 16 through 18 are for purposes of example and illustration and are not limiting of a vast number of computing device configurations that may be utilized for practicing embodiments of the invention, described herein.

FIG. 16 is a block diagram illustrating example physical components (i.e., hardware) of a computing device 1600 with which embodiments of the invention may be practiced. The computing device components described below may be suitable for the computing devices described above. In a basic configuration, the computing device 1600 may include at least one processing unit 1602 and a system memory 1604. Depending on the configuration and type of computing device, the system memory 1604 may comprise, but is not limited to, volatile storage (e.g., random access memory), non-volatile storage (e.g., read-only memory), flash memory, or any combination of such memories. The system memory 1604 may include an operating system 1605 and one or more program modules 1606 suitable for running software applications 1620 such as a document management engine 175. The operating system 1605, for example, may be suitable for controlling the operation of the computing device 1600. Furthermore, embodiments of the invention may be practiced in conjunction with a graphics library, other operating systems, or any other application program and is not limited to any particular application or system. This basic configuration is illustrated in FIG. 16 by those components within a dashed line 1608. The computing device 1600 may have additional features or functionality. For example, the computing device 1600 may also include additional data storage devices (removable and/or non-removable) such as, for example, magnetic disks, optical disks, or tape. Such additional storage is illustrated in FIG. 16 by a removable storage device 1609 and a non-removable storage device 1610.

As stated above, a number of program modules and data files may be stored in the system memory 1604. While executing on the processing unit 1602, the program modules 1606, such as the document management engine/application 175, may perform processes including, for example, one or more of the stages of methods 700, 1500. The aforementioned process is an example, and the processing unit 1602 may perform other processes. Other program modules that may be used in accordance with embodiments of the present invention may include electronic mail and contacts applications, word processing applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 16 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the document management engine/application 175 may be operated via application-specific logic integrated with other components of the computing device 1600 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1600 may also have one or more input device(s) 1612 such as a keyboard, a mouse, a pen, a sound input device, a touch input device, a microphone, a gesture recognition device, etc. The output device(s) 1614 such as a display, speakers, a printer, etc. may also be included. The aforementioned devices are examples and others may be used. The computing device 1600 may include one or more communication connections 1616 allowing communications with other computing devices 1618. Examples of suitable communication connections 1616 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 1604, the removable storage device 1609, and the non-removable storage device 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1600. Any such computer storage media may be part of the computing device 1600.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 17A:
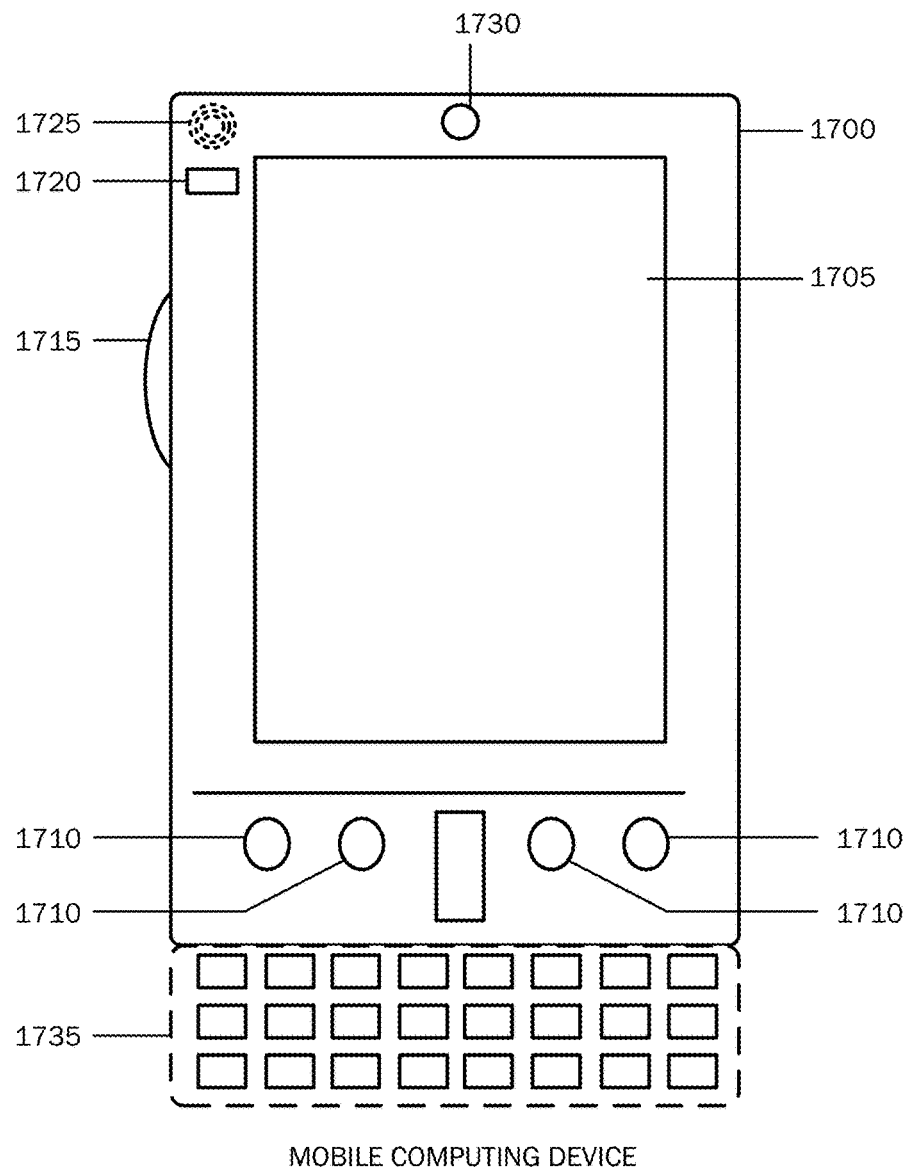
FIGS. 17A and 17B are simplified block diagrams of a mobile computing device with which embodiments of the present invention may be practiced.
Figure 17B:
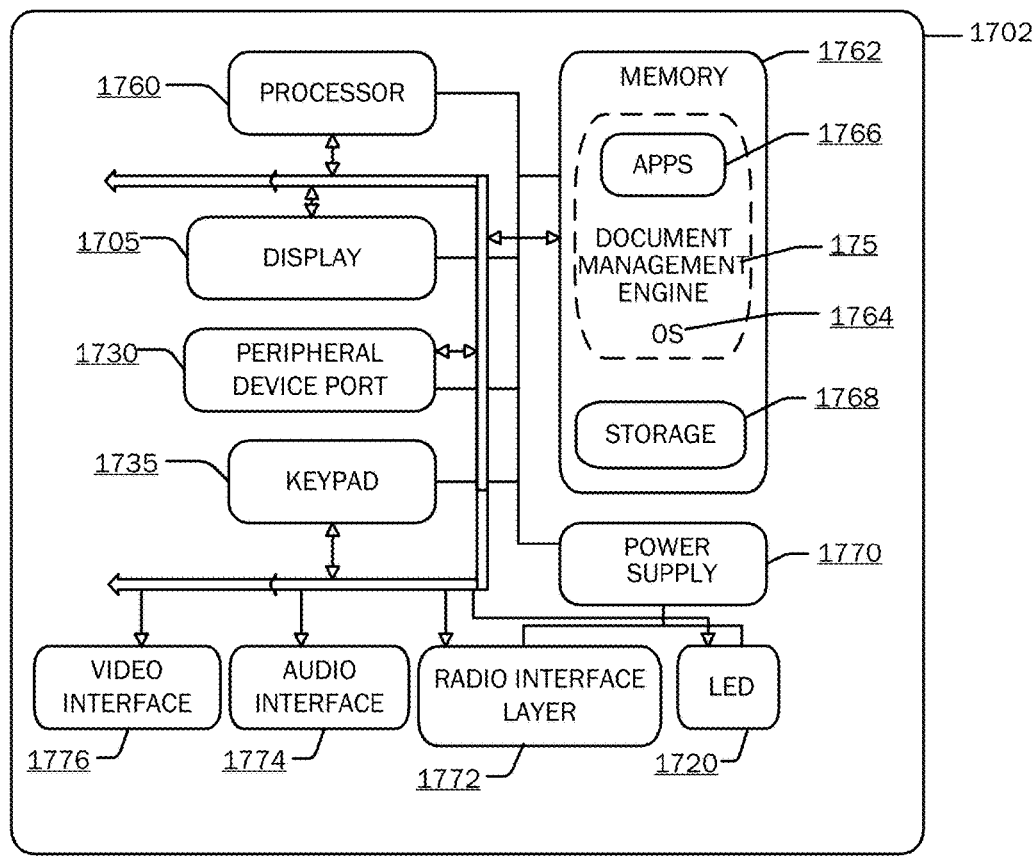
Figure 18:
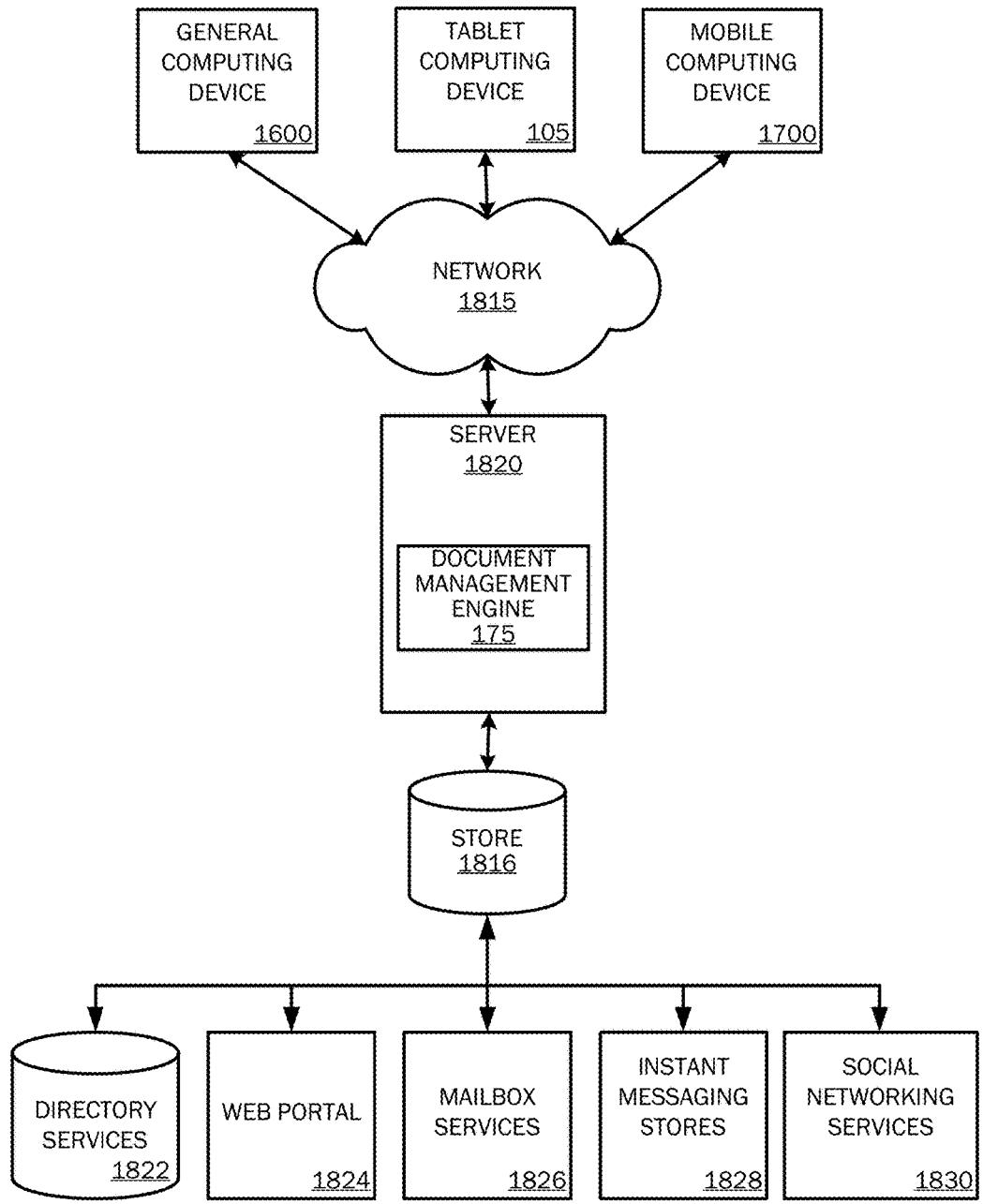
FIG. 18 is a simplified block diagram of a distributed computing system in which embodiments of the present invention may be practiced.

FIGS. 17A and 17B illustrate a mobile computing device 1700, for example, a mobile telephone, a smart phone, a tablet personal computer, a laptop computer, and the like, with which embodiments of the invention may be practiced. With reference to FIG. 17A, an exemplary mobile computing device 1700 for implementing the embodiments is illustrated. In a basic configuration, the mobile computing device 1700 is a handheld computer having both input elements and output elements. The mobile computing device 1700 typically includes a display 1705 and one or more input buttons 1710 that allow the user to enter information into the mobile computing device 1700. The display 1705 of the mobile computing device 1700 may also function as an input device (e.g., a touch screen display). If included, an optional side input element 1715 allows further user input. The side input element 1715 may be a rotary switch, a button, or any other type of manual input element. In alternative embodiments, mobile computing device 1700 may incorporate more or less input elements. For example, the display 1705 may not be a touch screen in some embodiments. In yet another alternative embodiment, the mobile computing device 1700 is a portable phone system, such as a cellular phone. The mobile computing device 1700 may also include an optional keypad 1735. Optional keypad 1735 may be a physical keypad or a "soft" keypad generated on the touch screen display. In various embodiments, the output elements include the display 1705 for showing a graphical user interface (GUI), a visual indicator 1720 (e.g., a light emitting diode), and/or an audio transducer 1725 (e.g., a speaker). In some embodiments, the mobile computing device 1700 incorporates a vibration transducer for providing the user with tactile feedback. In yet another embodiment, the mobile computing device 1700 incorporates input and/or output ports, such as an audio input (e.g., a microphone jack), an audio output (e.g., a headphone jack), and a video output (e.g., a HDMI port) for sending signals to or receiving signals from an external device.

FIG. 17B is a block diagram illustrating the architecture of one embodiment of a mobile computing device. That is, the mobile computing device 1700 can incorporate a system (i.e., an architecture) 1702 to implement some embodiments. In one embodiment, the system 1702 is implemented as a "smart phone" capable of running one or more applications (e.g., browser, e-mail, calendaring, contact managers, messaging clients, games, and media clients/players). In some embodiments, the system 1702 is integrated as a computing device, such as an integrated personal digital assistant (PDA) and wireless phone.

One or more application programs 1766 may be loaded into the memory 1762 and run on or in association with the operating system 1764. Examples of the application programs include phone dialer programs, e-mail programs, personal information management (PIM) programs, word processing programs, spreadsheet programs, Internet browser programs, messaging programs, and so forth. The system 1702 also includes a non-volatile storage area 1768 within the memory 1762. The non-volatile storage area 1768 may be used to store persistent information that should not be lost if the system 1702 is powered down. The application programs 1766 may use and store information in the non-volatile storage area 1768, such as e-mail or other messages used by an e-mail application, and the like. A synchronization application (not shown) also resides on the system 1702 and is programmed to interact with a corresponding synchronization application resident on a host computer to keep the information stored in the non-volatile storage area 1768 synchronized with corresponding information stored at the host computer. As should be appreciated, other applications may be loaded into the memory 1762 and run on the mobile computing device 1700, including the document management engine/application 175 described herein.

The system 1702 has a power supply 1770, which may be implemented as one or more batteries. The power supply 1770 might further include an external power source, such as an AC adapter or a powered docking cradle that supplements or recharges the batteries. The system 1702 may also include a radio 1772 that performs the function of transmitting and receiving radio frequency communications. The radio 1772 facilitates wireless connectivity between the system 1702 and the "outside world", via a communications carrier or service provider. Transmissions to and from the radio 1772 are conducted under control of the operating system 1764. In other words, communications received by the radio 1772 may be disseminated to the application programs 1766 via the operating system 1764, and vice versa.

The radio 1772 allows the system 1702 to communicate with other computing devices, such as over a network. The radio 1772 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1702 provides notifications using the visual indicator 1720 that can be used to provide visual notifications and/or an audio interface 1774 producing audible notifications via the audio transducer 1725. In the illustrated embodiment, the visual indicator 1720 is a light emitting diode (LED) and the audio transducer 1725 is a speaker. These devices may be directly coupled to the power supply 1770 so that when activated, they remain on for a duration dictated by the notification mechanism even though the processor 1760 and other components might shut down for conserving battery power. The LED may be programmed to remain on indefinitely until the user takes action to indicate the powered-on status of the device. The audio interface 1774 is used to provide audible signals to and receive audible signals from the user. For example, in addition to being coupled to the audio transducer 1725, the audio interface 1774 may also be coupled to a microphone to receive audible input, such as to facilitate a telephone conversation. In accordance with embodiments of the present invention, the microphone may also serve as an audio sensor to facilitate control of notifications, as will be described below. The system 1702 may further include a video interface 1776 that enables an operation of an on-board camera 1730 to record still images, video stream, and the like.

A mobile computing device 1700 implementing the system 1702 may have additional features or functionality. For example, the mobile computing device 1700 may also include additional data storage devices (removable and/or non-removable) such as, magnetic disks, optical disks, or tape. Such additional storage is illustrated in FIG. 17B by the non-volatile storage area 1768. Computer storage media may include volatile and nonvolatile, removable and non-removable media implemented in any method or technology for storage of information, such as computer readable instructions, data structures, program modules, or other data.

Data/information generated or captured by the mobile computing device 1700 and stored via the system 1702 may be stored locally on the mobile computing device 1700, as described above, or the data may be stored on any number of storage media that may be accessed by the device via the radio 1772 or via a wired connection between the mobile computing device 1700 and a separate computing device associated with the mobile computing device 1700, for example, a server computer in a distributed computing network, such as the Internet. As should be appreciated such data/information may be accessed via the mobile computing device 1700 via the radio 1772 or via a distributed computing network. Similarly, such data/information may be readily transferred between computing devices for storage and use according to well-known data/information transfer and storage means, including electronic mail and collaborative data/information sharing systems.

FIG. 18 illustrates one embodiment of the architecture of a system for providing the functionality of the document management engine/application 175 to one or more client devices, as described above. Content developed, interacted with or edited in association with the application 175 may be stored in different communication channels or other storage types. For example, various documents may be stored using a directory service 1822, a web portal 1824, a mailbox service 1826, an instant messaging store 1828, or a social networking site 1830. The document management engine/application 175 may use any of these types of systems or the like for providing information item collection and management, as described herein. A server 1820 may provide the application 175 to clients. As one example, the server 1820 may be a web server providing the application 175 over the web. The server 1820 may provide the application 175 over the web to clients through a network 1815. By way of example, the client computing device may be implemented as the computing device 1600 and embodied in a personal computer 1600, a tablet computing device 105 and/or a mobile computing device 1700 (e.g., a smart phone). Any of these embodiments of the client computing device 1600 may obtain content from the store 1816. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

We claim:

1. A method of navigating related information items, the method comprising:
   providing a graphical representation of a collection of files and folders within a single display view of an electronic display, the electronic display having a touch interface, including displaying:
   a graphical representation of a first folder and a graphical representation of a second folder;
   a graphical representation of a first file within the graphical representation of the first folder and a graphical representation of a second file within the graphical representation of the second folder; and
   a first graphical file indicator presenting a value indicating a number of unrepresented files within the graphical representation of the first folder;
   receiving a touch selection of the first graphical file indicator; and
   when the touch selection of the first graphical filed indicator is received:
   displaying for each one of the number of unrepresented files in the first folder a graphical representation of the unrepresented files within the graphical representation of the first folder,
   wherein the graphical representation of each of the unrepresented files is displayed in a left-to-right/right-to-left in-line display configuration, without deleting or moving off screen of the single display view the graphical representation of the first folder,
   wherein the single display view accommodates the space required for the in-line display configuration of each of the graphical representations of the unrepresented files of the first folder by moving the graphical representation of the second folder and the graphical representation of the second file within in the graphical representation of the second folder off-screen of the single display view,
   wherein the graphical representation of the second folder and the graphical representation of the second file within in the graphical representation of the second folder are moved off-screen in a left or right motion, and wherein the off-screen items are redisplayed on-screen in the single display view in response to left or right touch scrolling of the single display view.

2. The method of claim 1, wherein providing the graphical representation of the collection of files and folders comprises providing one or more of:
   a file thumbnail sketch;
   a file image;
   a file name; or
   a file attribute.

3. The method of claim 1, wherein providing the graphical representation of the collection of files and folders comprises providing one or more of:
   documents;
   data items;
   images; or
   objects.

4. The method of claim 3, wherein providing the graphical representation of the collection of files and folders comprises providing a graphical representation of a plurality of files related to each other according to a context.

5. The method of claim 1, further comprising, expanding the graphical representation of the folder to a size capable of illustrating that the displayed graphical representation of the unrepresented files are within the graphical representation of the folder.

6. The method of claim 1, further comprising collapsing the graphical representation of the first file through touch selection and updating the number of unrepresented files in the first graphical file indicator to reflect the collapsing of the graphical representation of the first file.

7. The method of claim 6, further comprising collapsing a graphical representation of a sub-folder within the graphical representation of the first folder through touch selection and updating a number of unrepresented sub-folders in a graphical sub-folder indicator to reflect the collapsing of the graphical representation of the sub-folder.

8. The method of claim 1, wherein the in-line display configuration comprises a touch-scrollable, two-row, multi-column format.

9. The method of claim 1, wherein each graphical representation of the file, folder, unrepresented file and unrepresented sub-folder includes an exterior boundary and wherein a name associated with each respective file, folder, unrepresented file and unrepresented folder is included within the exterior boundary.

10. A system for navigating a customized collection of files and folders, the system comprising:
    a memory storage; and
    a processing unit coupled to the memory storage, wherein the processing unit is operable to:
       assemble a collection of a plurality of files and folders from a variety of content sources;
       provide a graphical representation of the collection of files and folders within a single display view of an electronic display, the electronic displaying having a touch interface, including displaying:
          a graphical representation of a first folder and a graphical representation of a second folder;
          a graphical representation of a first file as being within the graphical representation of the first folder and a graphical representation of a second file as being within the graphical representation of the second folder; and
          a first graphical file indicator, wherein the first graphical file indicator is within the graphical representation of the first folder, the first graphical file indicator presenting a value indicating a number of unrepresented files within the graphical representation of the first folder;
       receive a touch selection of the first graphical file indicator; and
       when the touch selection of the first graphical filed indicator is received:
       display, in an in-line display configuration, without deleting or moving off-screen of the single display view the graphical representation of the first folder, for each one of the number of unrepresented files, a graphical representation of the unrepresented files as being within the graphical representation of the first folder,
       wherein the graphical representation of each of the unrepresented files is displayed in a left-to-right/right-to-left in-line display configuration, without deleting or moving off screen of the single display view the graphical representation of the first folder,
       wherein the single display view accommodates the space required for the in-line display configuration of each of the graphical representations of the unrepresented files by moving the graphical representation of the second folder and the graphical and the graphical representation of the second file within the second folder off-screen of the single display view,
       wherein the graphical representation of the second folder and the graphical and the graphical representation of the second file within the second folder are moved off-screen in a left or right motion, and wherein the off-screen items are redisplayed on-screen in the single display view in response to left or right touch scrolling of the single display view.

11. The system of claim 10, the processing unit being further operable to persist a display of the graphical representation of the customized collection of files and folders regardless of whether a display of other individual files or other folders not associated with the customized collection of files and folders changes.

12. The system of claim 10, the processing unit being further operable to assemble a collection of the plurality of files from the variety of content sources wherein the files are related to each other according to a context.

13. The system of claim 10, the processing unit being further operable to assemble a collection of the plurality of files from the variety of content sources wherein the files are related to each other as favorite files designated by a user.

14. An article manufacture in the form of computer storage media, the computer storage media storing instructions, which when executed by a computer cause the computer to perform in association with an electronic display having a touch interface:
    displaying within a single display view:
       a graphical representation of a first folder and a graphical representation of a second folder;
       a graphical representation of a first file within the graphical representation of the first folder and a graphical representation of a second file within the graphical representation of the second folder; and
       a first graphical file indicator presenting a value indicating a number of unrepresented files within the graphical representation of the first folder;
    receiving a touch selection of the first graphical file indicator; and when the touch selection of the first graphical filed indicator is received:

displaying for each one of the number of unrepresented files in the first folder a graphical representation of the unrepresented files within the graphical representation of the first folder, wherein the graphical representation of each of the unrepresented files is displayed in a left-to-right/right-to-left in-line display configuration, without deleting or moving off screen of the single display view of the graphical representation of the first folder, wherein the single display view accommodates the space required for the in-line display configuration of each of the graphical representations of the unrepresented files of the first folder by moving the graphical representation of the second folder and the graphical representation of the second file within in the graphical representation of the second folder off-screen of the single display view, wherein the graphical representation of the second folder and the graphical representation of the second file within in the graphical representation of the second folder are moved off-screen in a left or right motion, and wherein the off-screen items are redisplayed on-screen in the single display view in response to left or right touch scrolling of the single display view.

15. The method of claim 1, wherein the graphical representation of the second folder and the graphical representation of the second file within the graphical representation of the second folder are moved off-screen simultaneously.

16. The method of claim 15, wherein the off-screen graphical representation of the second folder and the graphical representation of the second file within the graphical representation of the second folder are pulled back on-screen simultaneously by the left or right touch scrolling.

\* \* \* \* \*